US009787865B2

(12) United States Patent
Yang et al.

(10) Patent No.: US 9,787,865 B2
(45) Date of Patent: Oct. 10, 2017

(54) IMAGE READING DEVICE AND IMAGE FORMING APPARATUS

(71) Applicant: FUJI XEROX CO., LTD., Tokyo (JP)

(72) Inventors: Munseok Yang, Kanagawa (JP); Daesung Kim, Kanagawa (JP); Seongwoo Baek, Kanagawa (JP); Senggyu Cho, Kanagawa (JP); Youngsea Park, Kanagawa (JP); Minsu Han, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/879,669

(22) Filed: Oct. 9, 2015

(65) Prior Publication Data

US 2016/0309048 A1 Oct. 20, 2016

(30) Foreign Application Priority Data

Apr. 14, 2015 (JP) .................. 2015-082207

(51) Int. Cl.
*H04N 1/40* (2006.01)
*H04N 1/04* (2006.01)
*H04N 1/00* (2006.01)

(52) U.S. Cl.
CPC ....... *H04N 1/00551* (2013.01); *H04N 1/0057* (2013.01); *H04N 1/0083* (2013.01); *H04N 1/00554* (2013.01); *H04N 1/00795* (2013.01); *H04N 2201/0094* (2013.01)

(58) Field of Classification Search
CPC ........... H04N 1/00551; H04N 1/00554; H04N 1/0057; H04N 1/00795; H04N 1/0083; H04N 2201/0094

USPC ....... 358/474, 496, 497, 498, 401, 400, 501, 358/500, 505, 408, 471, 29; 399/379, 399/380; 434/77
See application file for complete search history.

(56) References Cited

U.S. PATENT DOCUMENTS

| 8,514,463 | B2  |   | 8/2013 | Fujiwara  |               |
|-----------|-----|---|--------|-----------|---------------|
| 9,025,211 | B2  | * | 5/2015 | Miura     | H04N 1/00551  |
|           |     |   |        |           | 358/474       |
| 9,237,248 | B2  | * | 1/2016 | Osawa     | H04N 1/00543  |
| 9,247,087 | B2  | * | 1/2016 | Osakabe   | H04N 1/00554  |
| 9,323,201 | B2  | * | 4/2016 | Fujiwara  | G03G 15/605   |

(Continued)

FOREIGN PATENT DOCUMENTS

JP 2011-077874 A 4/2011

*Primary Examiner* — Cheukfan Lee
(74) *Attorney, Agent, or Firm* — Oliff PLC (57) ABSTRACT

An image reading device includes a housing including a support that supports a document, an opening and closing (O/C) member supported to rotate around a rotary shaft between an open position at which a top surface of the support is exposed and a closed position at which the top surface is covered by the O/C member, a reading member included in the O/C member to read the document, a processing unit included in the housing to process information read by the reading member, a connecting member electrically connecting the reading member and the processing unit, and a protective member whose first end is rotatably supported by the O/C member and that accommodates the connecting member in its internal space while being supported in a state of hanging from the O/C member and in a state where its second end is supported while not being constrained with respect to the housing.

14 Claims, 8 Drawing Sheets

(56) References Cited

U.S. PATENT DOCUMENTS

| | | | | |
|---|---|---|---|---|
| 2004/0084932 | A1* | 5/2004 | Suzuki | F16G 13/16 |
| | | | | 296/155 |
| 2009/0225375 | A1* | 9/2009 | Iwata | G03G 15/605 |
| | | | | 358/474 |
| 2011/0075226 | A1* | 3/2011 | Fujiwara | G03G 15/60 |
| | | | | 358/474 |
| 2011/0235082 | A1* | 9/2011 | Mukai | G03G 15/605 |
| | | | | 358/1.13 |
| 2011/0235139 | A1* | 9/2011 | Kurokawa | G03G 15/60 |
| | | | | 358/498 |
| 2011/0235140 | A1* | 9/2011 | Ito | G03G 15/605 |
| | | | | 358/498 |
| 2011/0242621 | A1* | 10/2011 | Takeuchi | G03G 15/60 |
| | | | | 358/498 |
| 2014/0139889 | A1* | 5/2014 | Osakabe | H04N 1/0083 |
| | | | | 358/408 |
| 2014/0293378 | A1* | 10/2014 | Kakuta | H04N 1/00559 |
| | | | | 358/498 |
| 2014/0334839 | A1* | 11/2014 | Ito | H02G 11/00 |
| | | | | 399/75 |
| 2015/0015920 | A1* | 1/2015 | Muraoka | H04N 1/00554 |
| | | | | 358/400 |
| 2015/0062814 | A1* | 3/2015 | Okauchi | H04N 1/00989 |
| | | | | 361/694 |
| 2016/0057300 | A1* | 2/2016 | Ishizuka | H04N 1/00559 |
| | | | | 358/474 |
| 2016/0065769 | A1* | 3/2016 | Miyase | H04N 1/00557 |
| | | | | 358/497 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2015-082207 filed Apr. 14, 2015.

BACKGROUND

Technical Field

The present invention relates to an image reading device and an image forming apparatus.

SUMMARY

According to an aspect of the invention, there is provided an image reading device including a housing that includes a support on which a document is to be supported, an opening and closing member that is supported so as to be capable of rotating with a rotary shaft acting as a center between an open position at which the opening and closing member allows a top surface of the support to be exposed and a closed position at which the opening and closing member allows the top surface of the support to be covered by the opening and closing member, a reading member that is included in the opening and closing member and that reads the document, a processing unit that is included in the housing and that processes information read by the reading member, a connecting member that electrically connects the reading member and the processing unit, and a protective member whose first end is rotatably supported by the opening and closing member and that accommodates the connecting member in an internal space of the protective member, the protective member being supported in a state of hanging from the opening and closing member and in a state where a second end of the protective member is supported in a state of not being constrained with respect to the housing.

BRIEF DESCRIPTION OF THE DRAWINGS

Exemplary embodiments of the present invention will be described in detail based on the following figures, wherein:

FIGS. 7A to 7D are diagrams illustrating an effect of a groove that is formed in the protective member of the exemplary embodiment, and FIG. 7A, FIG. 7B, FIG. 7C, and FIG. 7D are respectively a diagram illustrating a state where a portion of an flexible flat cable (FFC) on a first side has been received in the groove that is formed at the center of the protective member, a diagram illustrating the state illustrated in FIG. 7A with a portion of the FFC on a second side received in the groove, a diagram illustrating a state where the portion of the FFC on the first side has been received in the groove that is formed in an end portion of the protective member, and a diagram illustrating the state illustrated in FIG. 7C with the portion of the FFC on the second side received in the groove.

DETAILED DESCRIPTION

Although an exemplary embodiment of the present invention will now be described with reference to the drawings, the present invention is not limited to the following exemplary embodiment.

Note that, for ease of understanding of the following description, in the drawings, a front-rear direction, a left-right direction, and a top-bottom direction are respectively defined as the X-axis direction, the Y-axis direction, and the Z-axis direction, and directions or sides indicated by arrows X, −X, Y, −Y, Z, and −Z are respectively defined as a forward direction, a backward direction, a right direction, a left direction, an upward direction, and a downward direction or the front side, the rear side, the right side, the left side, the top side, and the bottom side.

In addition, a symbol having "•" in "○" denotes an arrow extending from the distal side to the proximal side as viewed in the drawings, and a symbol having "x" in "○" denotes an arrow extending from the proximal side to the distal side as viewed in the drawings.

Note that, in the following description, which refers to the drawings, descriptions of components that are not necessarily illustrated are omitted for ease of understanding of the following description.

[Exemplary Embodiment]

Figure 1:
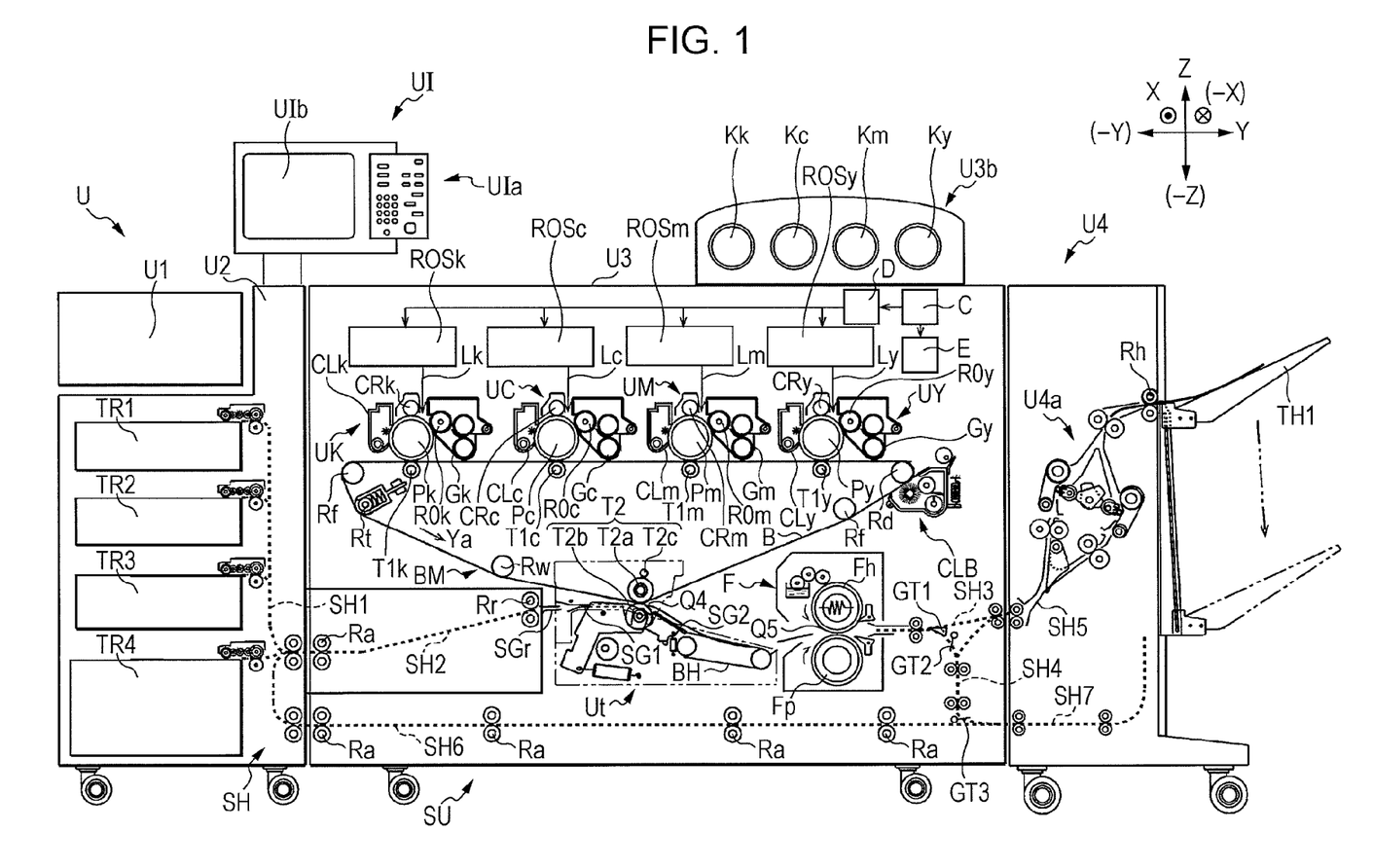
FIG. 1 is an overall view of an image forming apparatus of an exemplary embodiment.

FIG. 1 is an overall view of an image forming apparatus of an exemplary embodiment.

Figure 2:
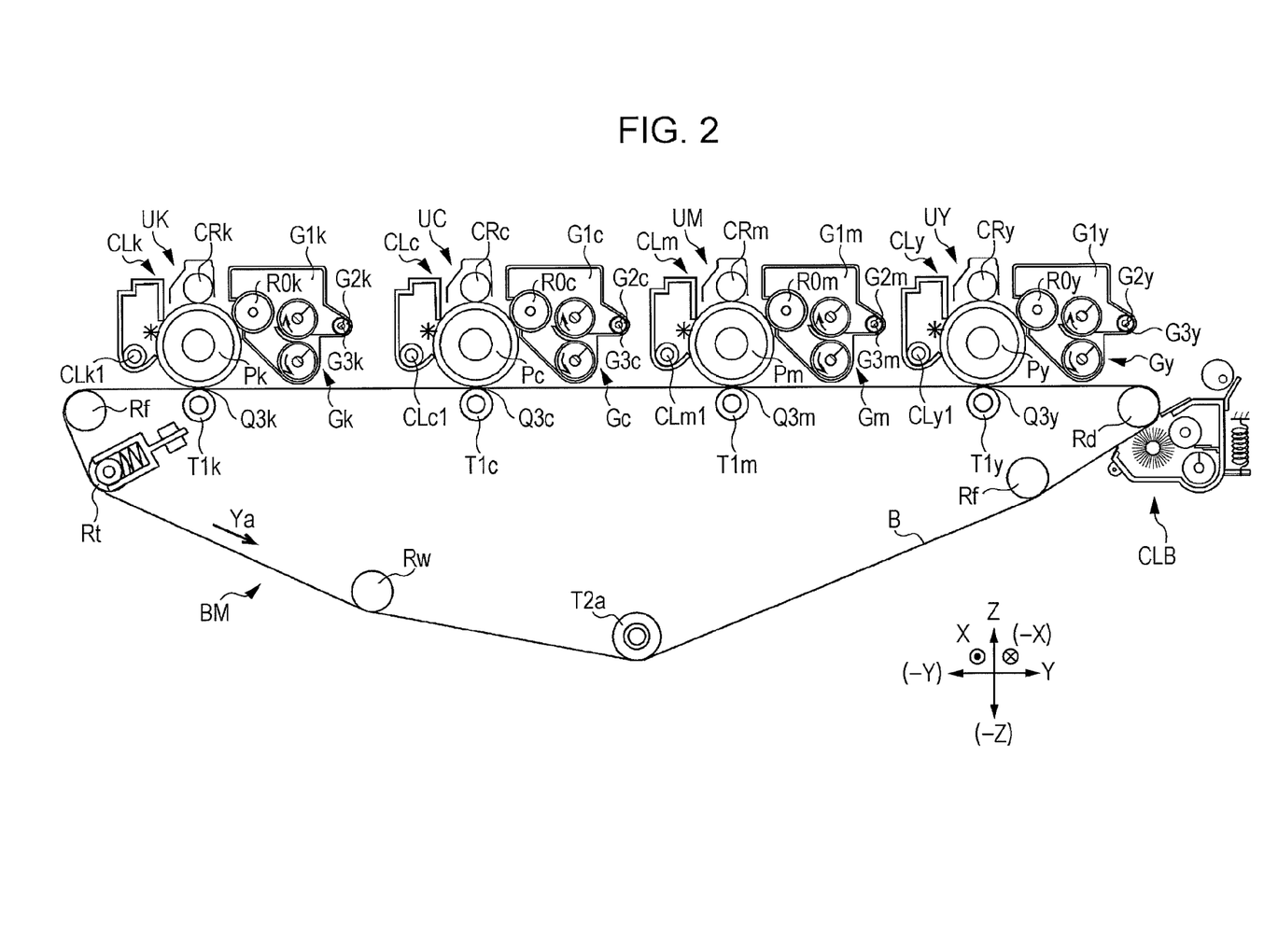
FIG. 2 is an enlarged view of a visible-image-forming apparatus of the exemplary embodiment.

FIG. 2 is an enlarged view of a visible-image-forming apparatus of the exemplary embodiment.

In FIG. 1, a copying machine U, which is an example of an image forming apparatus, includes an operation unit UI, a scanner unit U1, which is an example of an image reading device, a feeder unit U2, which is an example of a media-supply device, an image forming unit U3, which is an example of an image recording apparatus, and a media-processing unit U4.

(Description of Operation Unit UI)

The operation unit UI includes input buttons UIa that are used for starting a copying operation, setting the number of sheets to be copied, and the like. The operation unit UI further includes a display UIb that displays the contents of a data item input by using the input buttons UIa and the state of the copying machine U.

(Description of Scanner Unit U1)

Figure 3:
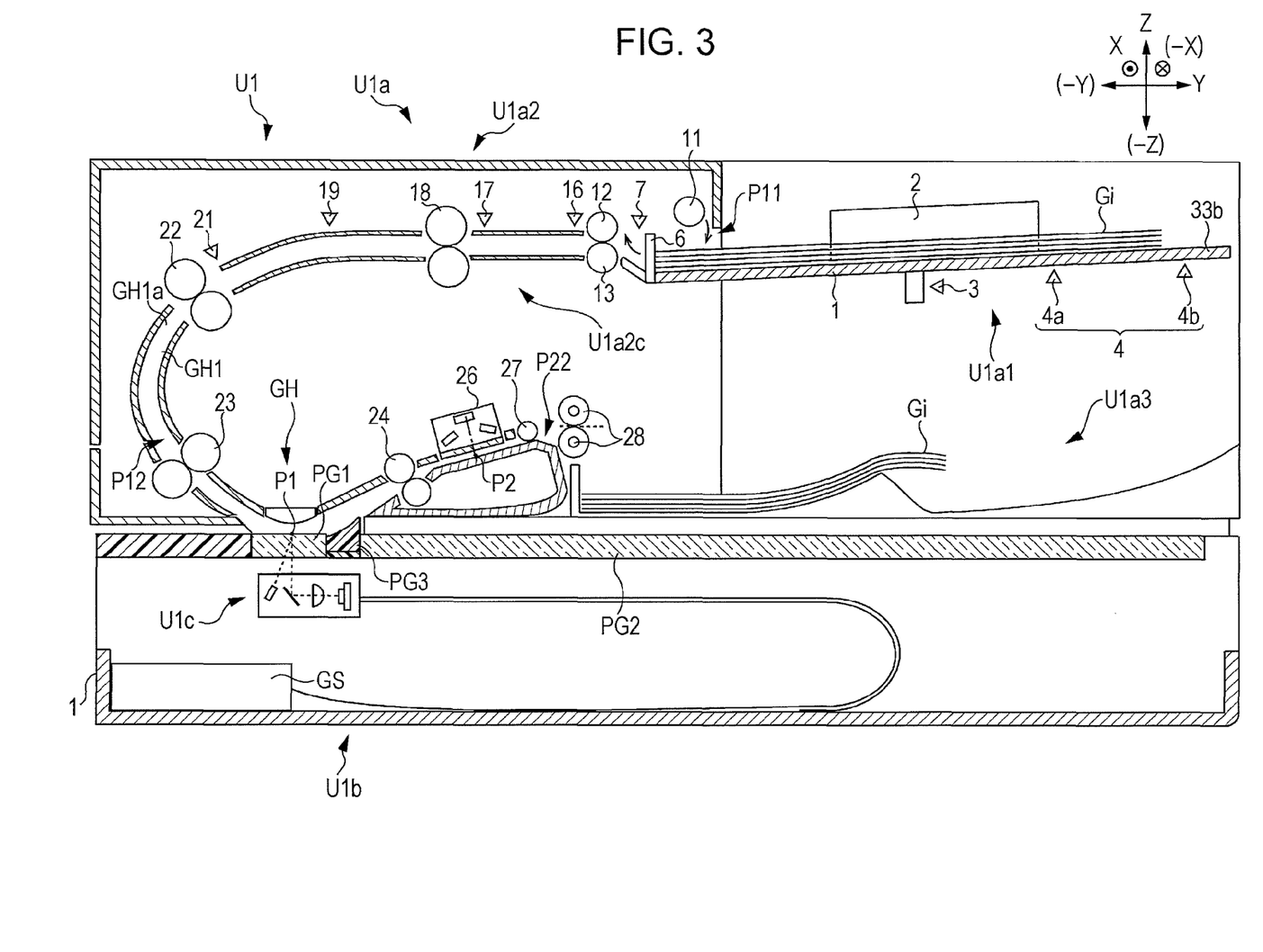
FIG. 3 is an overall view of an image reading device of the exemplary embodiment.

FIG. 3 is an overall view of the image reading device of the exemplary embodiment.

In FIG. 1 and FIG. 3, the scanner unit U1 includes, as an example of a body of the image reading device, a scanner body U1b that includes a transparent document table PG formed in an upper end portion of the scanner body U1b. A document-transport device U1a is disposed on a top surface of the scanner body U1b. The document-transport device U1a is supported in such a manner as to allow the document table PG to be exposed or covered by the document-transport device U1a.

The document-transport device U1a includes, as an example of a document-stacking unit, a document-sheet-feeding tray U1a1 in which plural documents Gi, which are to be copied, are accommodated in such a manner as to be stacked on top of one another. A document-transport unit U1a2 is disposed on the left side of the document-sheet-feeding tray U1a1. The document-transport unit U1a2 transports the documents Gi, which are accommodated in the document-sheet-feeding tray U1a1, to the document table PG. A document-sheet-ejection tray U1a3, which is an example of a document-ejection unit, is disposed below the document-sheet-feeding tray U1a1. The documents Gi that have passed through the document table PG are ejected to the document-sheet-ejection tray U1a3 from the document-transport unit U1a2.

In FIG. 3, a reading window PG1, which is an example of a first reading surface and through which the documents Gi pass, is formed in a left end portion of the document table PG. The reading window PG1 is formed so as to correspond to a first-surface-reading position P1, which is set beforehand on a transport path formed in the document-transport device U1a. The documents Gi that are transported by the document-transport device U1a pass through the reading window PG1. A platen glass PG2 on which one of the documents Gi, which is placed by a user, is supported is arranged on the right side of the reading window PG1. A document guide PG3, which is an example of a guiding portion, is supported between the reading window PG1 and the platen glass PG2. The document guide PG3 guides the documents Gi, which have passed through the reading window PG1, into the document-transport device U1a.

In the scanner unit U1 of the exemplary embodiment, a reading unit U1c, which is an example of a reading unit, is disposed below the document table PG. The reading unit U1c of the exemplary embodiment is supported in such a manner as to be capable of moving in the left-right direction, which is an example of a subscanning direction, along a bottom surface of the document table PG. The reading unit U1c is normally stationary at an initial position, which is indicated by a solid line in FIG. 3. Note that the reading unit U1c is electrically connected to an image processing unit GS.

The image processing unit GS converts electrical signals of red (R), green (G), and blue (B), which are input from the reading unit U1c, into image information items of black (K), yellow (Y), magenta (M), and cyan (C). The image information items are temporarily stored in the image processing unit GS and output, as image information items for use in latent image formation, to a driving circuit D of latent-image-forming devices ROSy to ROSk of the image forming unit U3 at a predetermined timing.

Note that, in the case where a document image is a monochromatic image, or specifically a black-and-white image, only the black (K) image information item is input to the driving circuit D of the latent-image-forming devices ROSy to ROSk.

(Description of Feeder Unit U2)

In FIG. 1, the feeder unit U2 includes sheet-feeding trays TR1, TR2, TR3, and TR4, each of which is an example of a media container. The feeder unit U2 further includes a medium-supply path SH1 that takes out one of recording sheets S, which are examples of media and which are accommodated in the sheet-feeding trays TR1 to TR4, and transports the recording sheet S to the image forming unit U3.

(Description of Image Forming Unit U3 and Media-Processing Unit U4)

In FIG. 1 and FIG. 2, in the image forming unit U3, the driving circuit D of the latent-image-forming devices ROSy to ROSk outputs a driving signal to each of the latent-image-forming devices ROSy to ROSk for different colors on the basis of image information items, which are input from the scanner unit U1, and the like. Image carriers Py to Pk, chargers CRy to CRk, and the like are disposed below the latent-image-forming devices ROSy to ROSk. Each of the latent-image-forming devices ROSy to ROSk forms an electrostatic latent image on a surface of a corresponding one of the image carriers Py to Pk, and the electrostatic latent images are developed into toner images, which are examples of visible images, by developing devices Gy to Gk. Note that each of the developing devices Gy to Gk is to be replenished with a developer from a corresponding one of toner cartridges Ky to Kk, which are mounted on a developer replenishing device U3b. The toner images on the surfaces of the image carriers Py to Pk are transferred onto an intermediate transfer belt B, which is an example of an intermediate transfer body, by first transfer units T1y to T1k in first transfer regions Q3y to Q3k. The image carriers Py to Pk are cleaned by cleaning units CLy to CLk after a first transfer process.

An intermediate transfer device BM is supported below the latent-image-forming devices ROSy to ROSk. The intermediate transfer device BM includes the intermediate transfer belt B, which is an example of an intermediate transfer member, and support members Rd+Rt+Rw+Rf+T2a of the intermediate transfer member. The intermediate transfer belt B is supported so as to be capable of performing a rotational movement in the direction of arrow Ya. A second transfer unit Ut is disposed below the opposing member T2a. The second transfer unit Ut includes a second transfer member T2b. The second transfer member T2b forms a second transfer region Q4 by being in contact with the intermediate transfer belt B. In addition, a power supplying member T2c is in contact with the opposing member T2a. A second transfer voltage having a polarity the same as the charge polarity of a toner is to be applied to the power supplying member T2c.

A transport path SH2 along which the recording sheets S, which are transported from the feeder unit U2, are to be transported is arranged below the intermediate transfer device BM. In the transport path SH2, each of the recording sheets S is transported by transport rollers Ra, which are examples of transport members, to registration rollers Rr, which are examples of members for adjusting the timing of transportation of the recording sheets S. The registration rollers Rr transport one of the recording sheets S to the second transfer region Q4 in accordance with the timing at which toner images on the intermediate transfer belt B are transported to the second transfer region Q4.

The toner images on the intermediate transfer belt B are transferred onto the recording sheet S by a second transfer unit T2 upon passing through the second transfer region Q4. Note that the intermediate transfer belt B is cleaned by an intermediate-transfer-body cleaning unit CLB after a second transfer process. The recording sheet S, to which the toner images have been transferred, is sent to a media-transport belt BH, which is an example of a transport member, and transported to a fixing device F. In the fixing device F, as a result of the recording sheet S, to which the toner images have been transferred, passing through a fixing region Q5, which is a region in which a heating member Fh and a pressure member Fp are in contact with each other, the toner images are fixed onto the recording sheet S.

When the recording sheet S, to which the toner images have been fixed, is ejected, the recording sheet S is transported to a transport path SH5 of the media-processing unit U4 from a transport path SH3. A curve-correction member U4a is disposed in the media-processing unit U4 so that the curvature of the recording sheet S, or specifically the curl of the recording sheet S, is corrected, and then, the recording sheet S is ejected to an ejection tray TH1 by an ejection member Rh. In the case where an image is to be recorded on a second surface of the recording sheet S, the recording sheet S, which has the toner images fixed to a first surface thereof, is transported from the transport path SH3 to a reverse path SH4 and a circulation path SH6, and the recording sheet S is flipped over. Then, the recording sheet S is sent to the second transfer region Q4 again as a result of passing through the transport path SH2. Note that switching of the recording sheet S destination is performed by switching members GT1 to GT3. A sheet-transport path SH includes the elements indicated by reference numerals SH1 to SH7. A sheet transport device SU of the exemplary embodiment includes the elements indicated by reference numerals SH, Ra, Rr, Rh, SGr, SG1, SG2, BH, and GT1 to GT3.

(Description of Document-Transport Device)

In FIG. 3, the document-sheet-feeding tray U1a1, which is an example of a document-accommodating unit, includes a sheet-feeding tray body 1, which is an example of a stacking member. The sheet-feeding tray body 1 is in the form of a plate extending obliquely upward.

A set gate 6, which is an example of a media-aligning member, is disposed in a left end portion of the document-sheet-feeding tray U1a1. The set gate 6 is rotatably supported. The set gate 6 is held in a hung state before the documents Gi are transported. Upon start of the transportation of the documents Gi, the set gate 6 is released so as to be rotatable toward the downstream side, and thus, the set gate 6 will not hinder the transportation of the documents Gi.

A nudger roller 11, which is an example of a document pick-up member, is disposed above the set gate 6 and on the upstream side in a transport direction of the documents Gi. The nudger roller 11 of the exemplary embodiment is capable of moving up and down.

A feed roller 12, which is an example of a document-transport member, is disposed downstream from the set gate 6. A retard roller 13, which is an example of a document-separating member, is disposed below the feed roller 12 so as to face the feed roller 12.

Take-away rollers 18, each of which is an example of a document-transport member and an example of an inclination-correction member, are disposed downstream from the feed roller 12.

Pre-registration rollers 22, each of which is an example of a document-transport member, are disposed downstream from the take-away rollers 18.

Document-registration rollers 23, each of which is an example of a document-transport member, are disposed downstream from the pre-registration rollers 22. The document-registration rollers 23 adjust the timing at which one of the documents Gi is transported toward the first-surface-reading position P1.

Out rollers 24, each of which is an example of a document-transport member, are disposed downstream from the document-registration rollers 23 in such a manner as to be disposed further downstream than the first-surface-reading position P1.

A second-surface-reading position P2 is set downstream from the out rollers 24. A reading sensor 26, which is an example of a second reading member, is disposed at the second-surface-reading position P2. The reading sensor 26 of the exemplary embodiment is formed of a contact image sensor (CIS).

A reading roller 27, which is an example of a reading-supporting member, is disposed downstream from the reading sensor 26. Ejection rollers 28 that eject the documents Gi to the document-sheet-ejection tray U1a3 are disposed downstream from the reading roller 27.

(Description of Connecting Member and Protective Member)

Figure 4:
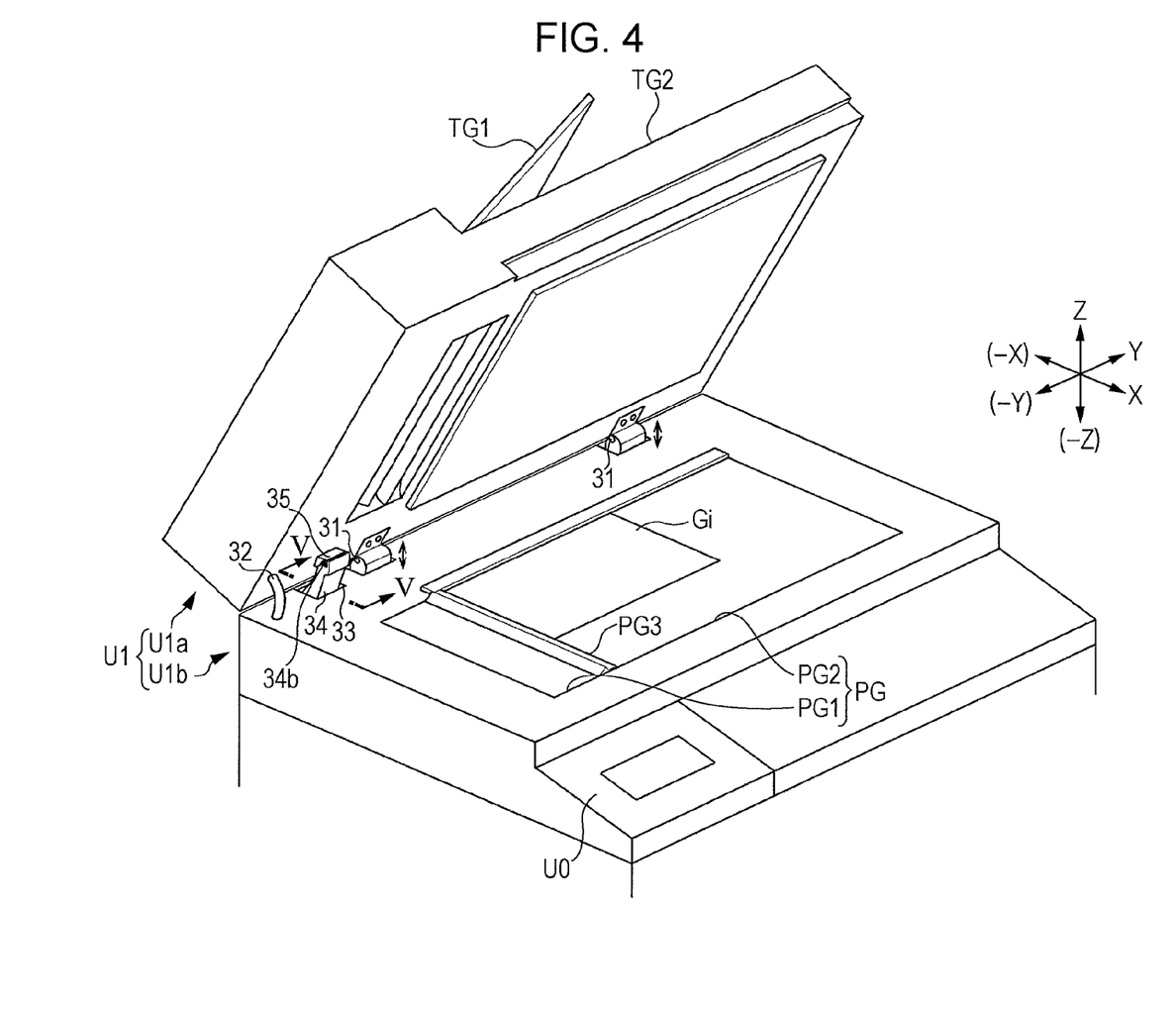
FIG. 4 is a perspective view of the image reading device of the exemplary embodiment.

FIG. 4 is a perspective view of the image reading device of the exemplary embodiment.

In FIG. 4, the document-transport device U1a, which is an example of an opening and closing member, is supported so as to be capable of being opened and closed with respect to the scanner body U1b, which is an example of a housing, with a left-and-right pair of rotary shafts 31 each acting as a center. In the exemplary embodiment, the rotary shafts 31 are supported in such a manner as to be capable of moving in the top-bottom direction in order to compatible with reading of a thick book, such as a dictionary or a lexicon. Note that, since a configuration in which rotary shafts are supported in such a manner as to be capable of moving in the top-bottom direction is commonly known in the related art, detailed descriptions will be omitted.

A cable 32, which is an example of a wiring line, extends between the scanner body U1b and the document-transport device U1a. The cable 32 is used for power supply to a motor of each of the rollers 11 to 28 and transmission of a control signal to the motor.

Figure 5A:
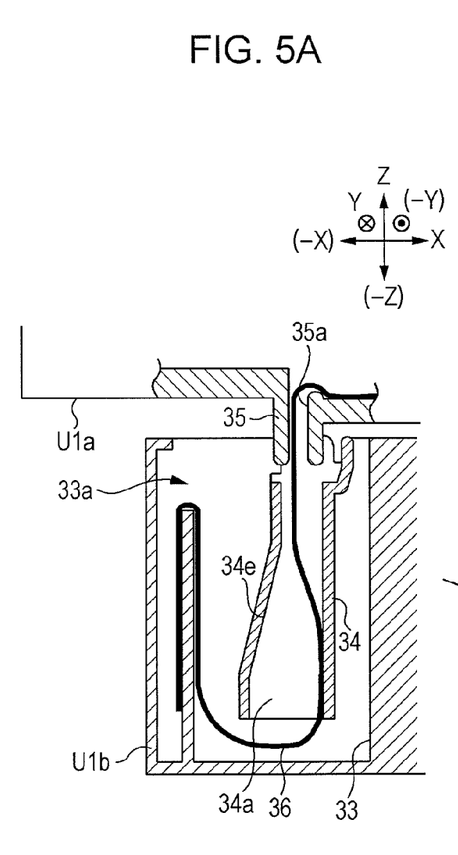
FIGS. 5A to 5C are cross-sectional views taken along line V-V of FIG. 4, and FIG. 5A, FIG. 5B, and FIG. 5C are respectively a diagram illustrating a state where a document-transport device has been moved to a closed position, a diagram illustrating a state where the document-transport device has been moved to an open position, and a diagram illustrating a state where the document-transport device has been moved upward from the open position.
Figure 5B:
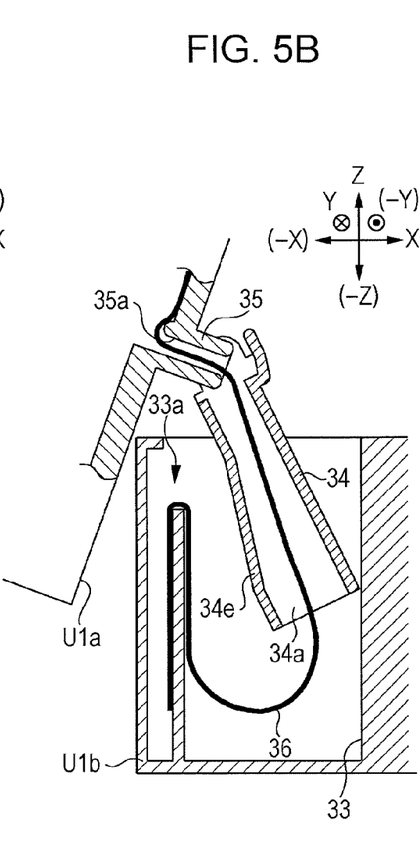
Figure 5C:
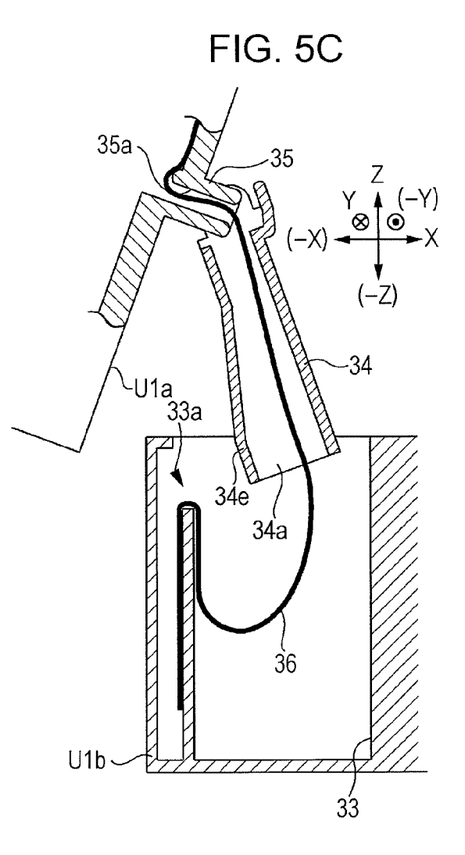

FIGS. 5A to 5C are cross-sectional views taken along line V-V of FIG. 4, and FIG. 5A, FIG. 5B, and FIG. 5C are respectively a diagram illustrating a state where the document-transport device U1a has been moved to a closed position, a diagram illustrating a state where the document-transport device U1a has been moved to an open position, and a diagram illustrating a state where the document-transport device U1a has been moved upward from the open position.

In FIG. 4 and FIGS. 5A to 5C, a recess 33, which is an example of an accommodating portion, is formed in a left rear portion of the scanner body U1b. A flexible flat cable (FFC) holder 34, which is an example of a protective member, is accommodated in the recess 33.

In FIGS. 5A to 5C, an internal space 34a of the FFC holder 34 extending in the top-bottom direction is in the form of a hollow substantially square cylinder. A left-and-right pair of centers of rotations 34b are formed in an upper end of the FFC holder 34, which is an example of one end of the FFC holder 34. The centers of rotations 34b are rotatably supported by a support portion 35 of the document-transport device U1a. Note that, in the exemplary embodiment, the centers of rotations 34b are not arranged coaxially with the rotary shafts 31.

Accordingly, the FFC holder 34 of the exemplary embodiment is supported in a hung state with respect to the document-transport device U1a. The recess 33 is formed so as to be sufficiently large with respect to the FFC holder 34, and a gap is formed between the FFC holder 34 and the recess 33 in the front-rear, left-right, and top-bottom directions. Thus, the FFC holder 34 is accommodated in the recess 33 in a state of floating in the recess 33 and accommodated in the recess 33 in a state of not being constrained with respect to the recess 33.

Figure 6:
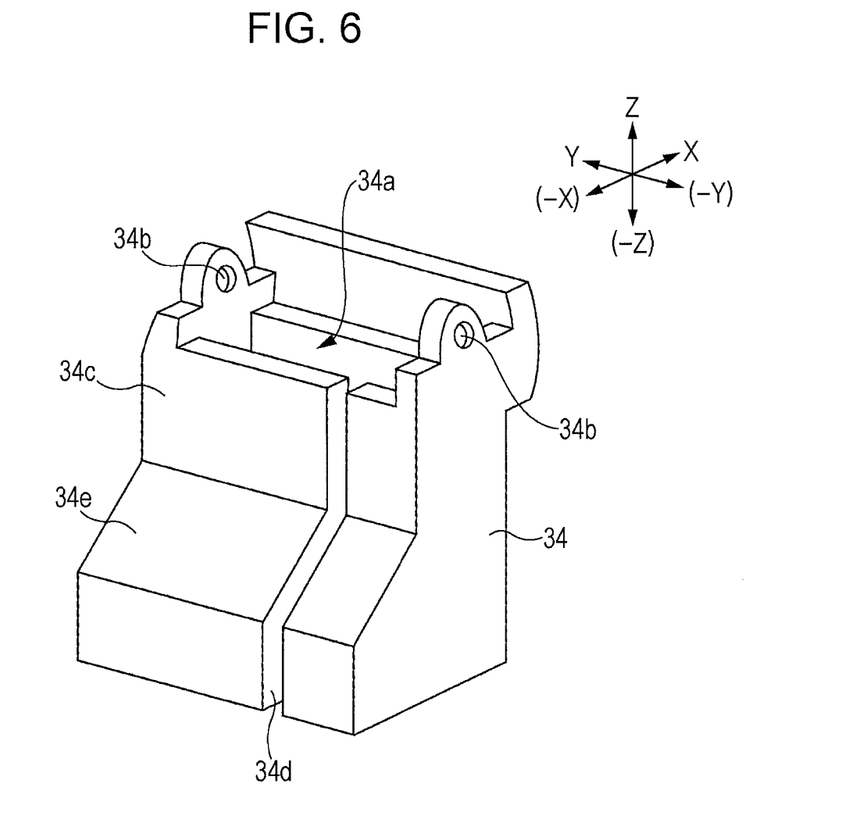
FIG. 6 is a perspective view of the protective member as seen from the rear.

FIG. 6 is a perspective view of the FFC holder 34 of the exemplary embodiment as seen from the rear. In FIG. 6, a slit 34d, which is an example of a groove, is formed in a rear surface 34c of the FFC holder 34. The slit 34d of the exemplary embodiment is formed so as to extend from an upper end to a lower end of the rear surface 34c and connects the internal space 34a and the outside. The slit 34d of the exemplary embodiment is formed at a position further toward the left side in the left-right direction than a center portion of the rear surface 34c.

In the FFC holder 34 of the exemplary embodiment, a lower portion 34e of the rear surface 34c projects backward.

In FIGS. 5A to 5C, a flexible flat cable (hereinafter referred to as FFC) 36, which is an example of a connecting member, is accommodated in the internal space 34a of the FFC holder 34. The FFC 36 electrically connects the reading sensor 26 and the image processing unit GS, which is an example of a processing unit. Consequently, the FFC 36 transmits an image information item read by the reading sensor 26 to the image processing unit GS.

A portion of the FFC 36 of the exemplary embodiment on the side on which the image processing unit GS is disposed is introduced into the recess 33 from a rear introduction portion 33a of the recess 33. The FFC 36 that has been introduced to the recess 33 extends downward and is bent upward in a lower portion of the recess 33 in such a manner as to be introduced into the FFC holder 34 from below. The FFC 36 extends through an area inside the FFC holder 34 in the upward direction and is wired into the document-transport device U1a via an introduction port 35a that is formed in the support portion 35.

(Function of Image Reading Device of Exemplary Embodiment)

In the scanner unit U1 of the exemplary embodiment, which has the above-described configuration, when the document-transport device U1a is used, the reading unit U1c is moved to an automatic-reading position at the left end. Then, the reading unit U1c reads one of the documents Gi that passes through the reading window PG1. Note that, in the case of reading the two surfaces of the document Gi, the two surfaces are read by the reading unit U1c and the reading sensor 26.

In the case of reading one of the documents Gi that is placed on a top surface of the platen glass PG2, the reading unit U1c is moved (i.e., is caused to scan) from the left end to the right end of the platen glass PG2 so as to read the document Gi placed on the platen glass PG2.

In FIGS. 5A to 5C, when the document-transport device U1a is opened or closed in order to place one of the documents Gi on a manually-operated reading glass PG2, remove one of the documents Gi after reading the document Gi, clean a glass PG1 and the glass PG2, or the like, the FFC holder 34 is moved with the movement of the document-transport device U1a. In this case, the FFC holder 34 moves up or down with respect to the recess 33. Then, the FFC 36, which is accommodated in the FFC holder 34, is also moved. When the rotary shafts 31 move up and down when one of the documents Gi, which is a portion of a thick dictionary or the like is read, the FFC holder 34 moves up and down with the movement of the rotary shafts 31 as illustrated in FIG. 5C.

In a configuration in which the FFC holder 34 is not provided, when the document-transport device U1a is opened, the FFC 36 is exposed in a state of extending across the document-transport device U1a and the scanner body U1b. In this state, when the document-transport device U1a is closed, there is a possibility that a portion of the FFC 36 that has been exposed may be pinched between the document-transport device U1a and the scanner body U1b, and as a result, the FFC 36 may become warped and/or may break. Therefore, the FFC holder 34 protects the FFC 36.

Figure 7A:
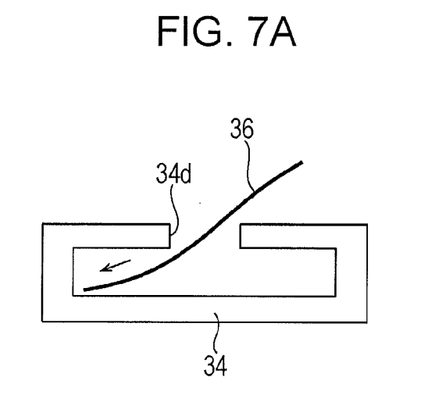
Figure 7B:
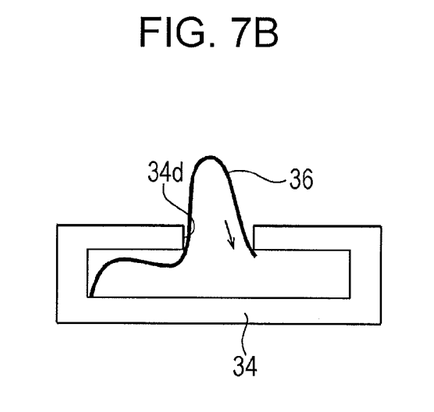
Figure 7C:
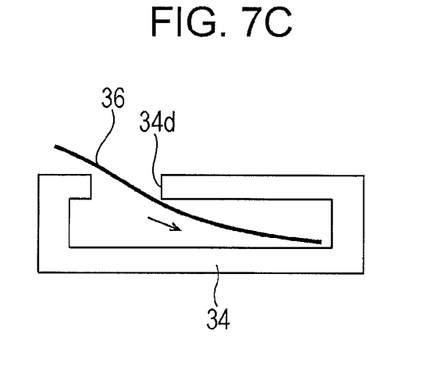
Figure 7D:
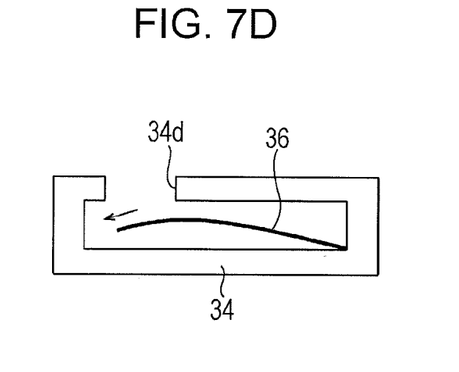

FIGS. 7A to 7D are diagrams illustrating an effect of a groove that is formed in the FFC holder 34 of the exemplary embodiment, and FIG. 7A, FIG. 7B, FIG. 7C, and FIG. 7D are respectively a diagram illustrating a state where a portion of the FFC 36 on a first side has been received in the groove that is formed at the center of the FFC holder 34, a diagram illustrating the state illustrated in FIG. 7A with a portion of the FFC 36 on a second side received in the groove, a diagram illustrating a state where the portion of the FFC 36 on the first side has been received in the groove that is formed in an end portion of the FFC holder 34, and a diagram illustrating the state illustrated in FIG. 7C with the portion of the FFC 36 on the second side received in the groove.

In the exemplary embodiment, the slit 34d is formed in the FFC holder 34. In particular, in the exemplary embodiment, the slit 34d is formed at a position that is offset with respect to the center of the FFC holder 34 in the left-right direction. In the case where the slit 34d is formed at the center of the FFC holder 34 in the left-right direction as illustrated in FIG. 7A and FIG. 7B, when the FFC 36 is inserted into or removed from the internal space 34a, particularly when a right end portion of the FFC 36 in a width direction is inserted first, and then, a left end portion of the FFC 36 is inserted, the FFC 36 is likely to be bent, and it is difficult to insert or remove the FFC 36.

Furthermore, in the exemplary embodiment, the slit 34d of the FFC holder 34 is formed in a rear surface of the FFC holder 34, the rear surface being opposite to the front surface of the FFC holder 34 that faces the document table PG. In the case where the slit 34d is formed in a front surface of the FFC holder 34, there is a possibility that the front surface of the FFC holder 34 will abut against the recess 33 when the document-transport device U1a is opened or closed, and there is a possibility that the FFC holder 34 will break starting from the slit 34d. However, in the exemplary embodiment, since the slit 34d is formed in the rear surface, the FFC holder 34 is less likely to break.

Compared with the case where the slit 34d is formed in the front surface, in the exemplary embodiment, the slit 34d is less likely to be seen by a user when the document-transport device U1a is opened, and thus, the appearance is improved.

Figure 8:
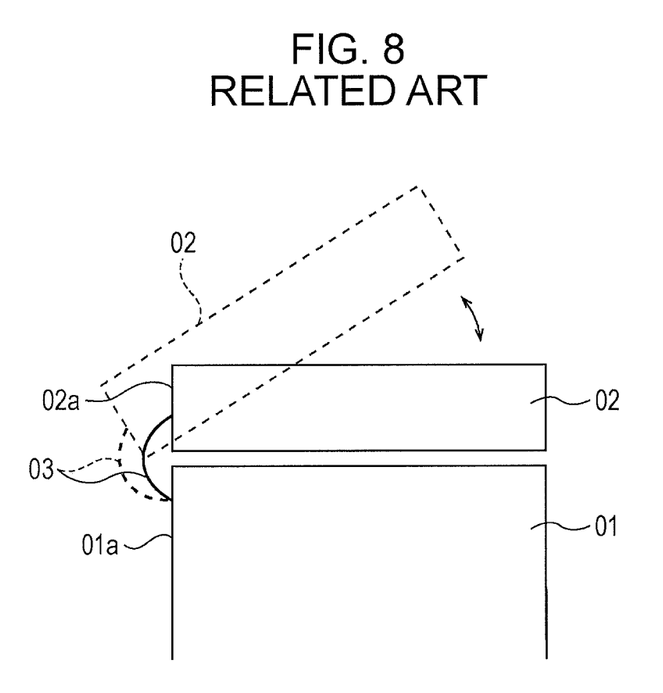
FIG. 8 is a diagram illustrating a method of a wiring connection between a scanner body and a document-transport device in a configuration of the related art.

FIG. 8 is a diagram illustrating a method of a wiring connection between a scanner body and a document-transport device in a configuration of the related art.

As illustrated in FIG. 8, in the configuration of the related art, a cable 03 electrically connects a scanner body 01 and a document-transport device 02 by extending across a rear surface 01a of the scanner body 01 and a rear surface 02a of the document-transport device 02 on the rear side. Thus, the configuration of the related art requires a space for mounting the cable 03 on the rear of an image forming apparatus, and this has been an obstacle to a reduction in the size of the image forming apparatus.

(Modifications)

Although the exemplary embodiment of the present invention has been described above, the present invention is not limited to the above exemplary embodiment, and various changes may be made within the scope of the present invention as described in the claims. Modifications (H01) to (H04) of the present invention will be described below as examples.

(H01) Although the copying machine U, which is an example of an image forming apparatus, has been described as an example in the above exemplary embodiment, the present invention is not limited to this and may be applied to, for example, a facsimile machine or a multifunction machine that has functions of serving as a facsimile machine, a printer, a copying machine, and the like. The present invention is not limited to an electrophotographic image forming apparatus and may be applied to an image forming apparatus, such as a printing machine (e.g., Risograph), that employs any image-forming method, such as an ink-jet recording method or a thermal head method. The present invention is not limited to a multicolor-developing image forming apparatus, and the present invention may be realized by using a monochromatic image forming apparatus, or specifically a black-and-white image forming apparatus. Although, in the above exemplary embodiment, the scanner unit U1 has been described as an example of an image reading device, and the configuration in which the scanner unit U1 is included in the copying machine U has been described, the present invention is not limited to these and may be applied to a configuration of a single scanner.

(H02) Although, in the above-described exemplary embodiment, the slit 34d may be formed at a position that is offset with respect to the center of the FFC holder 34 in the left-right direction, the present invention is not limited to this. For example, the slit 34d may be formed in a center portion of the FFC holder 34. Alternatively, it is not impossible to pass the FFC 36 through the internal space 34a of the FFC holder 34 from the top-bottom direction without forming the slit 34d.

(H03) Although, in the above-described exemplary embodiment, the configuration in which the lower portion 34e of the FFC holder 34 protrudes backward is desirable, the present invention is not limited to this. A configuration in which the lower portion 34e does not protrude may be employed in the case where the FFC 36 is slackened enough or in the case where the strength of the FFC 36 is high.

(H04) Although, in the above-described exemplary embodiment, it is desirable that the document-transport device U1a be capable of moving up and down in order to be compatible with a document that is a portion of a thick dictionary or the like, the document-transport device U1a may not be capable of moving up and down.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a housing that includes a support on which a document is to be supported;
an opening and closing member that is supported so as to be capable of rotating with a rotary shaft acting as a center between an open position at which the opening and closing member allows a top surface of the support to be exposed and a closed position at which the opening and closing member covers the top surface of the support;
a reading member that is included in the opening and closing member and that reads the document;
a processing unit that is included in the housing and that processes information read by the reading member;
a connecting member that electrically connects the reading member and the processing unit; and
a protective member physically attached to the opening and closing member, a first end of the protective member being rotatably supported by the opening and closing member, wherein the protective member accommodates the connecting member in an internal space of the protective member, the protective member being supported in a state of hanging from the opening and closing member where a second end of the protective member opposite the first end is not constrained with respect to the housing, wherein the protective member rotates with respect to the housing when the opening and closing member is moved between the open position and the closed position, wherein one or more portions of interior surfaces of the internal space of the protective member do not contact the connecting member when the opening and closing member is in the open position or in the closed position.

2. The image reading device according to claim 1, wherein the protective member is formed in a substantially cylindrical shape and has a groove extending from the first end toward the second end of the protective member.

3. The image reading device according to claim 2, wherein the groove is formed in a surface of the protective member, the surface being opposite to a surface of the protective member that faces the support.

4. The image reading device according to claim 3, wherein a portion of the internal space of the protective member, in which the connecting member is accommodated, on the second end side of the protective member is formed in such a manner as to be wider than a portion of the internal space on the first end side of the protective member toward the side opposite to a side facing the support.

5. The image reading device according to claim 4, further comprising:
a rotary member that is supported so as to be capable of moving up and down with respect to the housing and that includes the rotary shaft.

6. The image reading device according to claim 3, further comprising:
a rotary member that is supported so as to be capable of moving up and down with respect to the housing and that includes the rotary shaft.

7. The image reading device according to claim 2, wherein a portion of the internal space of the protective member, in which the connecting member is accommodated, on the second end side of the protective member is formed in such a manner as to be wider than a portion of the internal space on the first end side of the protective member toward the side opposite to a side facing the support.

8. The image reading device according to claim 7, further comprising:
a rotary member that is supported so as to be capable of moving up and down with respect to the housing and that includes the rotary shaft.

9. The image reading device according to claim 2, further comprising:
a rotary member that is supported so as to be capable of moving up and down with respect to the housing and that includes the rotary shaft.

10. The image reading device according to claim 1,
wherein a portion of the internal space of the protective member, in which the connecting member is accommodated, on the second end side of the protective member is formed in such a manner as to be wider than a portion of the internal space on the first end side of the protective member toward the side opposite to a side facing the support.

11. The image reading device according to claim 10, further comprising:
a rotary member that is supported so as to be capable of moving up and down with respect to the housing and that includes the rotary shaft.

12. The image reading device according to claim 1, further comprising:
a rotary member that is supported so as to be capable of moving up and down with respect to the housing and that includes the rotary shaft.

13. An image forming apparatus comprising:
the image reading device according to claim 1 that reads an image of a document; and
an image-recording unit that records an image on a medium based on an image read by the image reading device.

14. An image reading device comprising:
a housing that includes a support on which a document is to be supported;
an opening and closing member that is supported so as to be capable of rotating with a rotary shaft acting as a center between an open position at which the opening and closing member allows a top surface of the support to be exposed and a closed position at which the opening and closing member covers the top surface of the support;
a reading member that is included in the opening and closing member and that reads the document;
a processing unit that is included in the housing and that processes information read by the reading member;
a connecting member that electrically connects the reading member and the processing unit; and
a protective member physically attached to the opening and closing member, a first end of the protective member being rotatably supported by the opening and closing member, wherein the housing includes an accommodating portion that accommodates the protective member therein when the opening and closing member is in the closed position, and wherein in the closed position the protective member is not in contact with sides of the accommodating portion, wherein the protective member accommodates the connecting member in an internal space of the protective member, and wherein one or more portions of interior surfaces of the internal space of the protective member do not contact the connecting member when the opening and closing member is in the open position or in the closed position.

* * * * *